United States Patent [19]

Asari et al.

[11] Patent Number: 4,683,630

[45] Date of Patent: Aug. 4, 1987

[54] METHOD FOR MANUFACTURING AN INTEGRATED WHEEL

[75] Inventors: Akira Asari, Osaka; Takashige Yamamura; Shigeo Hattori, both of Kobe; Tsuneya Ueno, Hyogo, all of Japan

[73] Assignee: Kabushiki Kaisha Kobe Seiko Sho, Kobe, Japan

[21] Appl. No.: 810,603

[22] Filed: Dec. 19, 1985

[30] Foreign Application Priority Data

Dec. 19, 1984 [JP] Japan .................................. 59-269437

[51] Int. Cl.$^4$ ............................................... B21K 1/32
[52] U.S. Cl. ..................................... 29/159.01; 72/68
[58] Field of Search ............. 29/159.01, 159 R, 159.1; 72/68, 85, 83

[56] References Cited

U.S. PATENT DOCUMENTS

| | | | |
|---|---|---|---|
| 3,263,315 | 8/1966 | O'Brien | 29/159.01 |
| 4,048,828 | 9/1977 | Lucas et al. | 29/159.01 |
| 4,528,734 | 7/1985 | Bever | 29/159.01 |

*Primary Examiner*—Percy W. Echols

*Attorney, Agent, or Firm*—Oblon, Fisher, Spivak, McClelland, & Maier

[57] ABSTRACT

A method for manufacturing an integrated wheel for a vehicle, on which a tire is mounted, by a combination of die forging work, press spreading work and rotative ironing work, the method including the steps of integrally molding by die forging work a disc of the wheel and a thick tubular portion whose outer peripheral surface is made approximately parallel to the axial direction of the wheel through the root portion enlarged in the outer peripheral edge of the disc in the diametrically outward direction; performing the work for spreading both axial end edges of the thick tube portion in the diametrically outward direction by means of a press and work for pressing a rotative ironing tool against the axial intermediate portion of the thick tubular portion carried out after or prior to said spreading step; allowing the material to escape in a direction opposite the travelling direction of the rotative ironing tool in the subsequent step during pressing; and thereafter pressing the rotative ironing tool against the pressed portion to move the tool in the other axial direction by the pressed portion for rotative ironing to draw the other axial portion.

3 Claims, 15 Drawing Figures

METHOD FOR MANUFACTURING AN INTEGRATED WHEEL

BACKGROUND OF THE INVENTION

1. Field of the Invention

The present invention relates to a method for manufacturing an integrated wheel for a vehicle, on which a tire is mounted, by a combination of billet die-forging press spreading and rotative ironing.

2. Description of the Prior Art

A method for manufacturing an integrated wheel for a vehicle, on which a tire is mounted, is disclosed in Japanese Patent Publication No. 26941/80.

This prior art will be briefly described with reference to FIG. 4 (1), (2), (3) and (4). FIG. 4 (1) shows a forged article 4 comprising a disc 1, a thick flange 2 and a thin flange 3, the article 4 being normally molded by three repetitions of die forging.

Then, the forged article 4 is set to a mold 5 shown in FIG. 4 (2), and the thick flange 2 is drawn axially and outwardly by rotative ironing. Thereafter the drawn portion 7 is spread outwardly by means of a press mold 6 as shown in FIG. 4 (3), after which it is placed in a finishing mold as shown in FIG. 4 (4) for processing by a finishing roller 9.

The aforementioned prior art has the following problems despite its merits.

Since the forged article 4 is processed so as to have the thin flange portion 3 corresponding to approximately the shape of a rim, there are involved problems in that at least three repetitions of die forging steps are required so as to thus increase the number of steps, and thus several kinds of molds having a complicated shape are required, many accessory work steps such as dismantling of the mold have to be made, and a higher production cost is involved.

Moreover, in the drawing step, material is caused to move in a drawing direction by the drawing step, and therefore the machining efficiency is deteriorated and the number of machinings increases, resulting in a reduction in service life of tools and in unevenness in the shape of products even if the latter are subjected to finishing.

SUMMARY OF THE INVENTION

It is therefore an object of the invention to provide an arrangement wherein in die forging, the shape of a forged article is formed as a simple shape whereby the forging load is small, the shape of mold is simple and the number of exchanges of the mold is less so as to enhance productivity, and in addition, even in the drawing by use of a rotative ironing tool, articles can be worked with less number of steps without impairing machining efficiency. Thus the present invention provides a method for manufacturing an integrated wheel for a vehicle, on which a tire is mounted, by a combination of die forging, press spreading and rotative ironing, the method comprising integrally molding by die forging a disc of the wheel and a thick tubular portion whose outer peripheral surface is made approximately parallel to the axial direction of the wheel through the root portion being enlarged in the outer peripheral edge of the disc in a diametrically outward direction; performing spreading of both axial end edges of said thick tube portion in the diametrically outward direction by means of a press and the step of pressing a rotative ironing tool against the axial intermediate portion of the thick tubular portion carried out after or prior to said spreading allowing the material to escape in a direction opposite the travelling direction of the rotative ironing tool in the subsequent step during pressing; and thereafter pressing the rotative ironing tool against the pressed portion to move the tool in the other axial direction by the pressed portion for rotative ironing to draw the other axial portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 (2) is a sectional view showing the spreading work;

FIG. 1 (3) and (4) are respectively sectional views showing rotative ironing in one axial direction;

FIG. 5 (2) is a sectional view showing the step of pressing;

FIG. 5 (3) is a sectional view showing spreading; and

FIG. 5 (4) is a sectional view showing the step of rotative ironing in an axial direction.

DESCRIPTION OF THE PREFERRED EMBODIMENTS

The embodiment of the present invention will now be described in detail.

Figure 1:
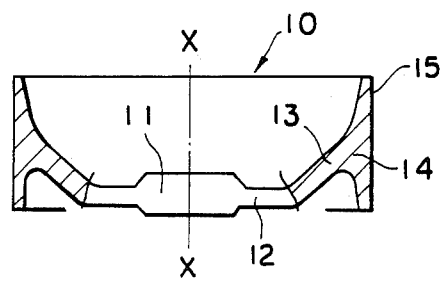
FIG. 1 (1) is a sectional view of a forged article subjected to die forging.
Figure 1:
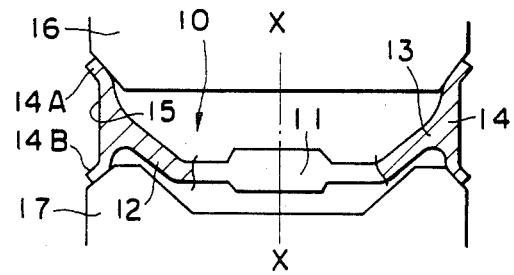
Figure 1:
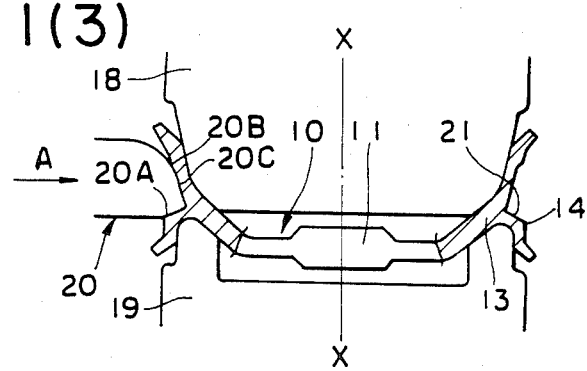
Figure 1:
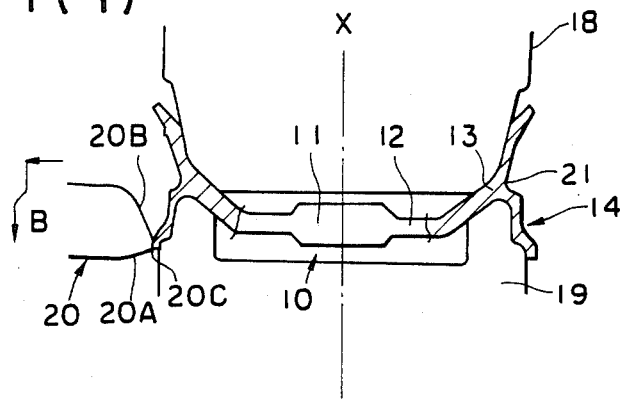

FIG. 1 (1) shows a forged article 10 molded from a billet through die forging. The forged article 10 comprises a disc 12 of a wheel having a boss 11 in the center thereof and an integrally molded thick tubular portion 14 through the root portion 13 spread in the diametrically outward direction on the outer peripheral edge thereof. The thick tubular portion 14 has its outer peripheral surface 15 which has a gradient and is formed approximately parallel to the axial direction of the wheel.

The forged article 10 has a simple shape and it is therefore possible for such to be molded normally by a single die forging step from the billet. Although a few repetitions of the die forging may be performed to mold the article, a single step will normally suffice.

FIG. 1 (2) shows the press spreading step. This spreading is performed in such a manner that flaring molds 16, 17 are used so that both axial end edges 14A, 14B of the thick tubular portion 14 are respectively spread in the diametrically outward direction by means of a press.

More specifically, the center of the forged article 10 subjected to die forging is brought into registration with the center X—X of the molds 16, 17. In the present embodiment, the mold 16 in the form of an upper movable mold is pressed down on the mold 17 in the form of a lower fixed mold to thereby spread both axial end edges 14a, 14B of the thick tubular portion 14 in a diametrically outward direction.

Next, the thick tubular portion 14 is subjected to spinning into the shape close to that of a rim flange of the wheel. That is, the thus spread forged article 10 is brought into registration with the center X—X of spinning molds 18, 19, which are in turn rotated about the axis and subsequently whereby the thick tubular portion 14 is subjected to a rotative ironing step.

In other words, a rotative ironing tool 20 shown in the form of a roller is pressed as shown against the axial intermediate portion of the outer peripheral surface 15 in the thick tubular portion 14 of the forged article 10 attached to the molds 18, 19 as shown in FIG. 1 (3), and the tool 20 is moved in one axial direction while maintaining the pressing state on the pressed portion 21 to draw one side of the thick tubular portion 14 into a shape close to that of the rim flange of the wheel as shown in FIG. 1 (4).

This drawing step is accomplished by the pressing work step A of the tool 20 and the succeeding contour movement force B of the tool 20 shown in FIG. 1 (4). The molds 18, 19 are rotated about the axes thereof during the contour movement step B to subject the outer peripheral surface 15 to spinning.

When during the pressing work A, the material escapes in an upward direction opposite the movement B in the downward axial direction of the tool 20, the machining efficiency is prevented from being deteriorated by the tool 20 to facilitate the molding in the succeeding step.

More specifically, the tool 20 is formed with a pressing portion 20c comprising a narrow taper surface 20A and a wide taper surface 20B. The wide taper surface 20B has an obtuse angle to facilitate the escape of material in the upward direction opposite the movement B direction in the axial direction of the tool 20 during pressing and the material escape so as to proceed to the succeeding step, thus enhancing the efficiency of the process.

Figure 2:
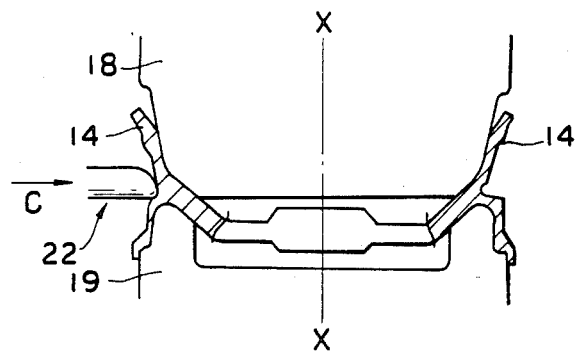
FIG. 2 (1) and (2) are respectively sectional views showing rotative ironing in the other axial direction.
Figure 2:
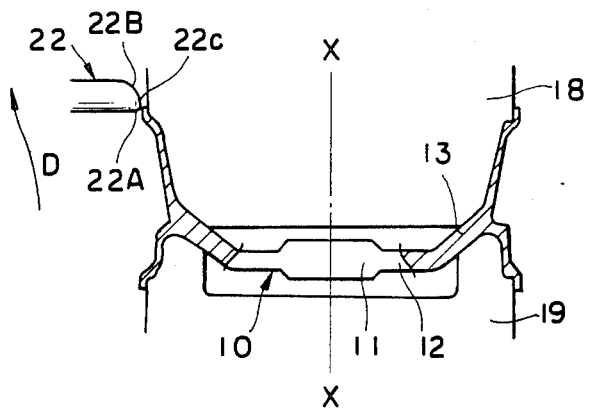

Subsequently, in the present embodiment, the pressing C of a separate rotative ironing tool 22 against the pressed portion 21 and the succeeding contour movement D of the tool 22 in the axial direction causes shaping of the material in the other axial direction as shown in FIG. 2 (1) and (2). This spinning step is done while using the molds 18, 19 without modification.

More specifically, the molds 18, 19 are rotated about their axes to press the pressing portion 22C of the tool 22 against the pressed portion 21, and movement D of the tool 22 in the axial direction causes the drawing to be initiated, where the ironing step close to the shape of a rim flange may be carried out.

While the tool 22 used herein is the same as the aforementioned tool 20, it is to be noted that in the present embodiment, the tool 22 is employed which has pressing portion 22c formed through both the taper surfaces 22A, 22B whose axial length is shorter than that of the tool 20, whereby during the movement D, the material is moved in the direction of the movement D for drawing.

Figure 3:
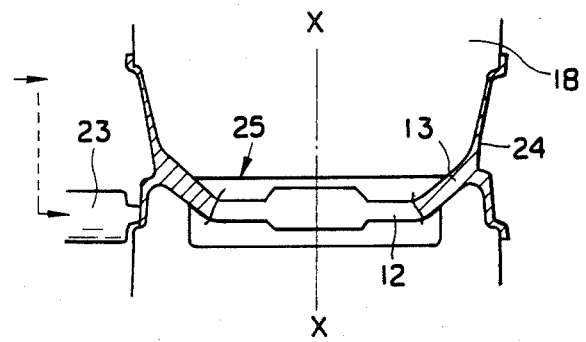
FIG. 3 is a sectional view showing the finishing step.
Figure 4:
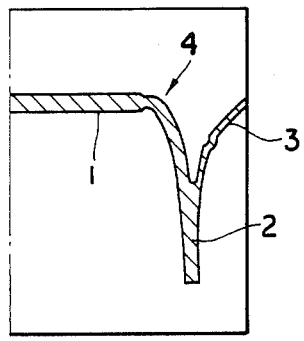
FIG. 4 (1), (2), (3) and (4) are respectively sectional views showing the prior art manufacturing method steps.
Figure 4:
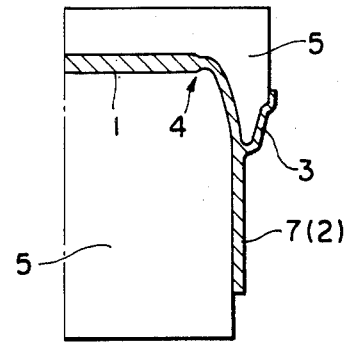
Figure 4:
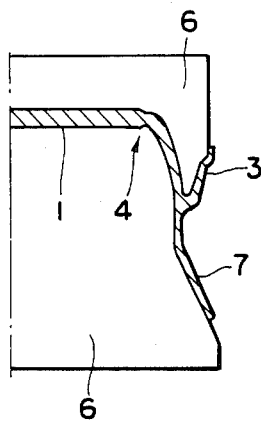
Figure 4:
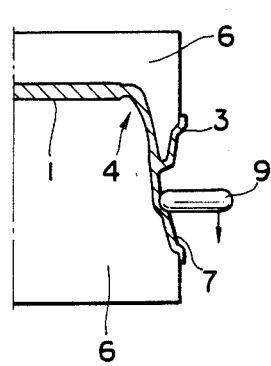

In the preferred embodiment of the pesent invention, the spinning molds 18, 19 are used without modification to produce an integrated wheel 25 having a rim flange of a final shape molded by the tool 23 shown by the finishing roller as shown in FIG. 3. Accordingly, the outer configuration of the spinning molds 18, 19 is formed into the shape applied to the shape of the inner peripheral surface of the rim flange 24.

Figure 5:
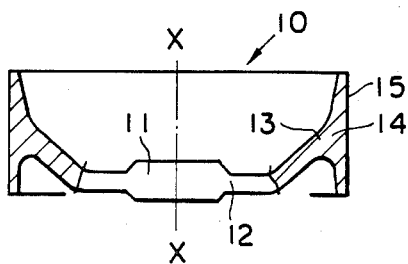
FIG. 5 (1) is a sectional view of a forged article subjected to die forging.
Figure 5:
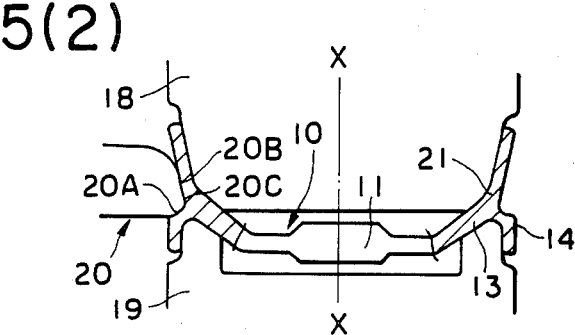
Figure 5:
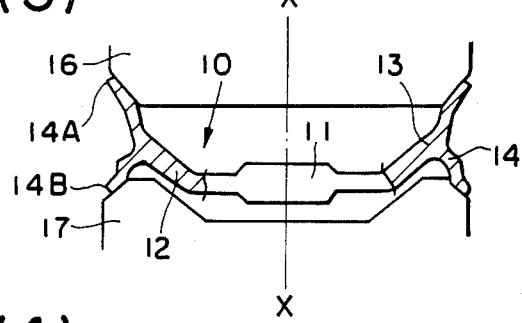
Figure 5:
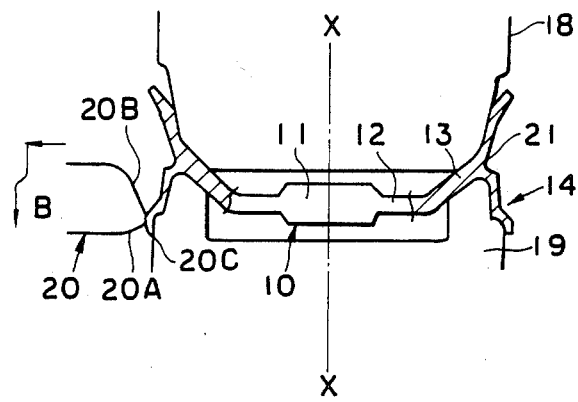

While in the embodiment shown in FIGS. 1 to 3, the work (FIG. 1 (3)) for pressing the rotative ironing tool against the axial intermediate portion of the thick tubular portion is carried out after the work (FIG. 1 (2)) for spreading both the axial end edges of the thick tubular portion in the diametrically outward direction by means of the press has been carried out, it will be noted that, as shown in FIG. 5 (1) to (4), after the step of pressing the rotative ironing tool 20 against the axial intermediate portion of the thick tubular portion 14 as shown in FIG. 5 (2) has been carried out, spreading of both axial end edges 14a, 14B of the thick tubular portion 14 in the diametrically outward direction by means of the press using the flaring molds 16, 17 as shown in FIG. 5 (3) is carried out, after which the material may be molded by the succeeding steps shown in FIGS. 2 and 3 via exactly the same step as that shown in FIG. 1 (4) shown in FIG. 5 (4).

Reference numerals used in FIG. 5 (1) to (4) correspond to those shown in FIG. 1 (1) to (4).

According to the present invention, heat treatment is rarely required due to the employment of working and hardening removal steps. However, the material may be subjected to annealing treatment after the spreading of both the axial end edges of the thick tubular portion 14 in the diametrically outward direction by means of the press has been carried out but prior to entry into the succeeding step, depending upon the final shape or material of a blank. That is, where the rate of spreading is large, the degree of hardening due to said step is high, in which case, it is suggested that the annealing treatment be applied prior to entry into the succeeding step.

According to the present invention, the forged article formed by the die forging step is an integrated molded article comprising a disc and a thick tubular portion whose outer peripheral surface is approximately parallel to the axial direction of the wheel through the root portion spread in the diametrically outward direction in the outer peripheral edge, and has a simple shape. Therefore, the forging load can be small, which means that a small press can be used, with the result being that the mold manufacturing cost is low and the service life thereof may be extended.

Furthermore, even if the shape of the forged article is formed into the simple shape as described above, the thick tubular portion allows the escape of material in the direction opposite the working direction during pressing thereof by the tool. Therefore, the working efficiency is not impaired. Since the rotative ironing step in the other axial direction is applied after the completion of the working step, the single spinning mold will suffice, and the mold exchanging step and the transfer of material between the steps is simple as well as less number of steps, thus enabling productivity to be enhanced.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing an integrated wheel for a vehicle, on which a tire is mounted, by a combination of die forging, press spreading and rotative ironing, wherein the method comprises:

integrally molding by die forging work a wheel disc with a peripheral thick tubular portion whose outer peripheral surface is made approximately parallel to the axial direction of the wheel and wherein said disc is spaced from opposite axial end edges of the tubular portion;

spreading said opposite axial end edges of said thick tubular portion in said diametrically outward direction by means of a press including first and second opposed press molds;

mounting said thick tubular portion on first and second spinning molds so as to bring said wheel into registration with a center portion of said spinning molds;

spinning said first and second spinning molds;

pressing a first rotative ironing tool against an axial intermediate portion of the spinning thick tubular portion for allowing material to escape in a first axial direction;

contour moving said first ironing tool in a second axial direction opposite said first axial direction so as to draw a first axial portion of said tubular portion; and thereafter pressing a second rotative ironing tool against the tubular portion and contour moving the second tool in said first axial direction for drawing a second axial portion of said tubular portion.

2. The method according to claim 1, wherein after spreading both axial end edges of the thick tubular portion in the diametrically outward direction by means of said press molds has been carried out, pressing the first rotative ironing tool against the axial intermediate portion of the thick tubular portion is carried out.

3. The method according to claim 1, wherein prior to spreading both axial end edges of the thick tubular portion in the diametrically outward direction by means of said press molds is carried out, pressing the first rotative ironing tool against the axial intermediate portion of thick tubular portion is carried out.

* * * * *